United States Patent [19]

Katsuyama et al.

[11] Patent Number: 4,577,300
[45] Date of Patent: Mar. 18, 1986

[54] DISC PLAYERS FOR REPRODUCING AN INFORMATION SIGNAL FROM A ROTATING DISC

[75] Inventors: Akira Katsuyama, Yokohama; Shuichi Kimura, Shiki, both of Japan

[73] Assignee: Sony Corporation, Tokyo, Japan

[21] Appl. No.: 511,928

[22] Filed: Jul. 8, 1983

[30] Foreign Application Priority Data

Jul. 12, 1982 [JP] Japan ............................ 57-105519[U]

[51] Int. Cl.$^4$ ............................................. G11B 21/10
[52] U.S. Cl. ..................................... 369/43; 358/907; 360/78; 360/10.1
[58] Field of Search ..................... 369/41, 43, 44, 30, 369/32, 111; 358/907; 360/78, 10.1

[56] References Cited

U.S. PATENT DOCUMENTS 4,414,584 11/1983 Kurata ................................. 358/907
4,428,074 1/1984 Abe ....................................... 369/32

Primary Examiner—Alan Faber
Attorney, Agent, or Firm—Lewis H. Eslinger; Alvin Sinderbrand

[57] ABSTRACT

A disc player for reproducing an information signal from a rotating disc having record tracks defined by successive turns of a spiral signal path in which the information signal is recorded, which is adapted to perform a small scale track jump operation for rapidly moving the reading position determined by a pick-up device in the direction transverse to the spiral signal path on the disc to a relatively short distance repeatedly in the fast forwarding or fast reversing mode and is so arranged that the number of times of the small scale track jump operation performed repeatedly for a certain period in the fast reversing mode is larger than the number of times of the small scale track jump operation performed repeatedly for the same certain period in the fast forwarding mode, whereby the substantial moving distance measured along the spiral signal path in respect of the reading position by the pick-up device moved for the certain period in the fast forwarding mode coincides with or closes to the substantial moving distance measured in the same manner in the fast reversing mode.

4 Claims, 12 Drawing Figures

FIG. 3
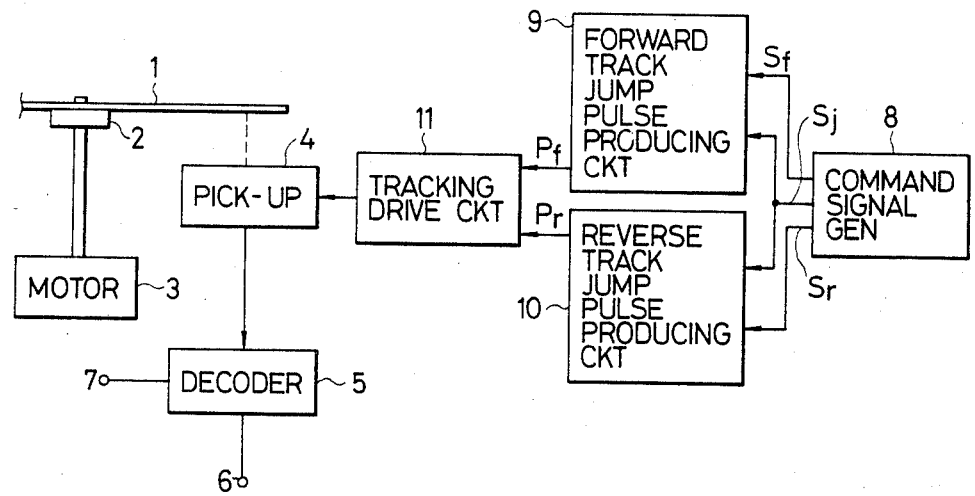

FIG. 4C
FIG. 4D
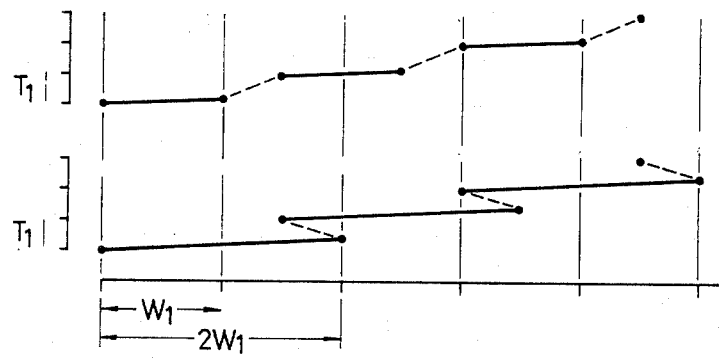

DISC PLAYERS FOR REPRODUCING AN INFORMATION SIGNAL FROM A ROTATING DISC

BACKGROUND OF THE INVENTION

This invention relates generally to apparatus for reproducing an information signal from a rotating disc on which the information signal is recorded in a spiral signal path defining record tracks, such as a digital audio disc, and more particularly is directed to improvements in a disc player of the type adapted to perform a small scale track jump operation repeatedly during the fast forwarding or fast reversing mode in which the reading position by a pick-up device is moved rapidly in the forward or reverse direction transverse to record tracks defined by successive turns of a spiral signal path on a disc.

As for an optical record disc such as a digital audio disc, an information signal such as an audio signal is recorded in a spiral signal path defining record tracks so as to be optically readable with, for example, an alignment of pits. When the information signal recorded on such an optical record disc is reproduced by a disc player, the optical record disc is rotated in such a manner as to keep the tangential velocity of the spiral signal path at a reading position by a pick-up device provided in the disc player (hereinafter referred as to the scanning velocity) constant at a predetermined value and the record tracks defined by successive turns of the spiral signal path on the optical record disc are scanned in turn by a light beam emitted from the pick-up device to determine the reading position so that the information signal is read from the record tracks by the pick-up device. In the case of the digital audio disc, generally, the information signal is recorded along the spiral signal path thereon in the direction from the innermost turn to the outermost turn and, in reproducing the information signal from the digital audio disc, the reading position by the pick-up device of the disc player is shifted gradually in the radial direction on the digital audio disc from the innermost radius to the outermost radius so as to obtain a correct reproduced information signal.

When a specific portion of the information signal recorded on the record disc is selectively reproduced by the disc player, the disc player is operative in the fast forwarding or reversing mode in which the reading position by the pick-up device on the record disc is moved rapidly in the direction transverse to the record tracks in order to shift the reading position by the pick-up device to a location where the specific portion of the information signal is recorded prior to the reading operation thereof. During such fast forwarding or reversing mode the disc player performs repeatedly a track jump operation in which the reading position by the pick-up device is controlled to move rapidly in the direction transverse to the record tracks to a record track which is located a number of tracks away from the record track at which the reading position of the pick-up device is presently situated. In such a case, the disc player is operative in the normal reproducing mode in which the information signal including address data or the like are read from the record track by the pick-up device for a predetermined short period whenever the track jump operation has been carried out once and then performs the next track jump operation, so that the track jump operation is performed repeatedly at intervals of the predetermined period.

In the fast forwarding mode, the reading position by the pick-up device on the record disc is rapidly moved in a forward direction defined by the direction of movement of the reading position by the pick-up device on the record disc in the normal reproducing mode, and in the fast reversing mode, the reading position by the pick-up device on the disc is rapidly moved in a reverse direction opposite to the forward direction. In relation to a record disc on which the information signal is recorded along the spiral signal path thereon in the direction from the innermost turn to the outermost turn, such as the digital audio disc, the forward direction coincides with the radial direction from the innermost radius to the outermost radius thereon.

In the disc player as mentioned above, there has arisen that a substantial moving distance measured along the spiral signal path in respect of the reading position by the pick-up device moved for a certain period in the fast forwarding mode is different from a substantial moving distance measured along the spiral signal path in respect of the reading position by the pick-up device moved for the same certain period in the fast reversing mode, and such a difference in substantial moving distance is especially remarkable in case that a small scale track jump operation, such as one track jump operation in which the reading position by the pick-up device is rapidly moved to an adjoining record track from the record track at which the reading position by the pick-up device is presently situated, is repeatedly performed during the fast forwarding or reversing mode. This results in the disadvantage that the moving speed of the reading position by the pick-up device in the fast forwarding mode is substantially higher than that in the fast reversing mode.

Referring now to FIGS. 1 and 2, the difference in substantial moving distance as above mentioned will be explained in detail hereinafter.

FIG. 1 shows the positional relation between the spiral signal path defining the record tracks on the record disc and the reading position by the pick-up device in the fast forwarding or reversing mode taken in the previously proposed disc player. Since the record disc is rotated at a predetermined constant scanning velocity, each one turn of the record disc spends different time depending on the reading position by the pick-up device on the record disc. For example, the time necessary for one turn of the record disc in the situation in which the reading position by the pick-up device is located at the innermost turn of the spiral signal path is about 130 msec. and the time for necessary for one turn of the record track in the situation in which the reading position by the pick-up device is located at the outermost turn of the spiral signal path is about 290 msec. Record tracks $L_a$, $L_b$ and $L_c$ shown in FIG. 1 are positioned at such an area on the record disc that the time for one turn of the record disc with the reading position by the pick-up device located thereat is about 200 msec., and the record disc is rotated in the direction indicated by an arrow R.

When the one track jump operation is repeatedly performed at intervals of the period of 100 msec. in regard to the record tracks $L_a$, $L_b$ and $L_c$ in the fast forwarding mode, by the first one track jump operation the reading position by the pick-up device is quickly moved, for example, from a point a on the record track $L_a$ to a point b on the record track $L_b$ which is adjoining outside to the record track $L_a$, and then the reading position by the pick-up device is controlled to trace the record track $L_b$ from the point b to a point c thereon under the operation in the normal reproducing mode, so that the information signal is read from the record track $L_b$. Next to this, the second one track jump operation is performed so that the reading position by the pick-up device is quickly moved from the point c to a point d on the record track $L_c$ which is adjoining outside to the record track $L_b$ and then controlled to trace the record track $L_c$ from the point d under the operation in the normal reproducing mode. After that, the one track jump operation is repeatedly performed at intervals of the reading period under the operation in the normal reproducing mode in the same manner as mentioned above, so that the reading position by the pick-up device is rapidly moved repeatedly at a track by track basis in the direction to the outermost turn of the spiral signal path on the record disc.

On the other hand, when the one track jump operation is repeatedly performed at intervals of the period of 100 msec. in regard to the record tracks $L_a$, $L_b$ and $L_c$ in the fast reversing mode, by the first one track operation the reading position by the pick-up device is quickly moved, for example, from a point e on the record track $L_b$ to a point f on the record track $L_a$ which is adjoining inside to the record track $L_b$, and then the reading position by the pick-up device is controlled to trace the record track $L_a$ from the point f to a point g thereon under the operation in the normal reproducing mode, so that the information signal is read from the track $L_a$. Next to this, the second one track jump operation is performed so that the reading position by the pick-up device is quickly moved from the point g to a point h on the record track which is adjoining inside to the record track $L_a$ and then controlled to trace the record track on which the point h is located under the operation in the normal reproducing mode. After that, the one track jump operation is repeatedly performed at intervals of the reading period under the operation in the normal reproducing mode in the same manner as mentioned above, so that the reading position by the pick-up device is rapidly moved repeatedly at a track by track basis in the direction to the innermost turn of the spiral signal path on the record disc.

FIGS. 2A and 2B show the movement of the reading position by the pick-up device which is moved by the above mentioned one track jump operation performed repeatedly during the fast forwarding mode and the fast reversing mode, respectively. In each of FIGS. 2A and 2B, the ordinate represents the time and the abscissa represents the distance measured along the spiral signal path on the record disc. Further, in FIGS. 2A and 2B, $T_1$ represents the period of the one track jump operation, that is, 100 msec. in this example and $W_1$ represents the length of one turn of the spiral signal path defining each of the record tracks $L_a$, $L_b$ and $L_c$ which are approximated hereon to have the same length.

Referring to FIGS. 2A and 2B, in the case of the fast forwarding mode, when the reading position by the pick-up device is quickly moved to the point b from the point a by the first one track jump operation, the substantial moving distance measured forward along the spiral signal path in respect of the reading position by the pick-up device corresponds to $W_1$ as shown with a soled line from a to b in FIG. 2A. Since the time necessary for performing the one track jump operation once is so short as to be negligible, the succeeding reading period in which the reading position by the pick-up device is controlled under the operation in the normal reproducing mode corresponds approximately to the period $T_1$ equal to 100 msec. Accordingly, the substantial moving distance measured forward along the spiral signal path in respect of the reading position by the pick-up device during the reading period before the second one track jump operation corresponds to a half of $W_1$, that is, $\frac{1}{2}W_1$ as shown with a broken line from b to c in FIG. 2A. After that, a further substantial moving distance measured forward along the spiral signal path in respect of the reading position by the pick-up device is obtained in the same manner in consequence of the second one track jump operation and other operation successive thereto, in turn. Consequently, the substantial moving distance measured forward along the spiral signal path in respect of the reading position by the pick-up device during each period $T_1$ corresponds to one and half turns of the spiral signal path at the area wherein the record tracks $L_a$, $L_b$ and $L_c$ are positioned, that is, $3/2W_1$.

To the contrary, in the case of the fast reversing mode, when the reading position by the pick-up device is quickly moved to the point f from the point e by the first one track jump operation, the substantial moving distance measured backward along the spiral signal path in respect of the reading position by the pick-up device corresponds to $W_1$ as shown with a solid line from e to f in FIG. 2B. Then, the substantial moving distance measured forward along the spiral signal path in respect of the reading position by the pick-up device during the succeeding reading period, in which the reading position by the pick-up device is controlled under the operation in the normal reproducing mode, corresponds to a half of $W_1$, that is, $\frac{1}{2}W_1$ as shown with a broken line from f to g in FIG. 2B. After that, a further substantial moving distance measured backward or forward along the spiral signal path in respect of the reading position by the pick-up device is obtained in the same manner in consequence of each of the second one track jump operation and other operation successive thereto. Consequently, in this case, the substantial moving distance measured backward along the spiral signal path in respect of the reading position by the pick-up device during each period $T_1$ corresponds to a half turn of the spiral signal path at the area wherein the record tracks $L_a$, $L_b$ and $L_c$ are positioned, that is, $\frac{1}{2}W_1$.

As described above, in case that the one track jump operation is repeatedly performed during the fast forwarding or reversing mode, a difference corresponding to one turn of the spiral signal path is made between the substantial moving distance measured along the spiral signal path in respect of the reading position by the pick-up device moved for a period of the one track jump operation in the fast forwarding mode and the substantial moving distance similarly measured in the fast reversing mode. This results from that the reading position by the pick-up device is controlled to trace forward the spiral signal path in the normal reproducing mode after each track jump operation in both the fast forwarding mode and the fast reversing mode. Accordingly, in case that a large scale track jump operation, such as a hundred track jump operation in which the reading position by the pick-up device is rapidly moved to traverse about one hundred of turns of the spiral signal path, is repeatedly performed during the fast forwarding or reversing mode, such a difference in substantial moving distance measured along the spiral signal path in respect of the reading position by the pick-up device is inconspicuous.

OBJECTS AND SUMMARY OF THE INVENTION

It is an object of the present invention to provide a record player of the type adapted to perform a small scale track jump operation, in which the reading position by a pick-up device is rapidly moved in the direction transverse a spiral signal path defining record tracks on a record disc to a relatively short distance, repeatedly during the fast forwarding or reversing mode, which aviods the above mentioned problem encountered with the prior art.

Another object of the present invention is to provide a disc player of the type adapted to perform a small scale track jump operation, in which the reading position by a pick-up device is rapidly moved in the direction transverse to a spiral signal path defining record tracks on a record disc to a relatively shot distance, repeatedly during the fast forwarding or reversing mode, which is improved to have the substantially same moving speed of the reading position by the pick-up device in both the fast forwarding mode and the fast reversing mode accompanied with the small scale track jump operation.

A further object of the present invention is to provide a disc player of the type adapted to perform a small scale track jump operation, in which the reading position by a pick-up device is rapidly moved in the direction transverse to a spiral signal path defining record tracks on a record disc to a relatively short distance, repeatedly during the fast forwarding or reversing mode, which is improved to perform the small scale track jump operation repeatedly in different manners during the fast forwarding mode and the fast reversing mode, respectively, so that the substantial moving distance measured along the spiral signal path in respect of the reading position by the pick-up device moved for a certain period in the fast forwarding mode coincides with or closes to the substantial moving distance measured along the spiral signal path in respect of the reading position by the pick-up device moved for the same certain period in the fast reversing mode.

According to an aspect of the present invention, there is provided an improved disc player which is adapted to perform a small scale track jump operation for rapidly moving the reading position by the pick-up device in the direction transverse to a spiral signal path defining record tracks on a record disc to a relatively short distance repeatedly during the fast forwarding or reversing mode, and is so arranged that the number of times of the small scale track jump operation carried out for a certain period in the fast reversing mode is larger than the number of times of the small scale track jump operation carried out for the same certain period in the fast reversing mode, whereby the substantial moving distance measured along the spiral signal path in respect of the reading position by the pick-up device moved for the certain period in the fast forwarding mode coincides with or closes to the substantial moving distance measured along the spiral signal path in respect of the reading position by the pick-up device moved for the certain period in the fast reversing mode.

The above, and other objects, features and advantages of the present invention will become apparent from the following detailed description thereof taken in conjunction with the accompanying drawings.

BRIEF DESCRIPTION OF THE DRAWINGS

FIG. 3 is a schematic illustration showing an essential portion of one example of a disc player according to the present invention;

FIGS. 4A to 4D are illustrations used for explaining the fast forwarding mode and the fast reversing mode, in each of which a small scale track jump operation is repeatedly performed, taken by the example shown in FIG. 3.

DESCRIPTION OF THE PREFERRED EMBODIMENT

Figure 1:
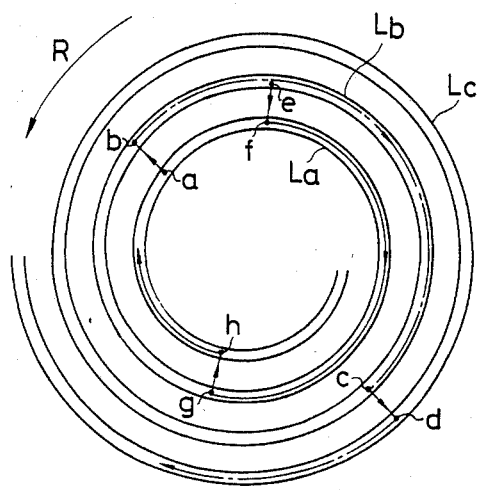
FIGS. 1, 2A and 2B are illustrations used for explaining the fast forwarding mode and the fast reversing mode, in each of which one track jump operation is repeatedly performed, taken by a previously proposed disc player of the type adapted to perform a small scale track jump operation repeatedly during the fast forwarding or reversing mode.
Figure 2A:
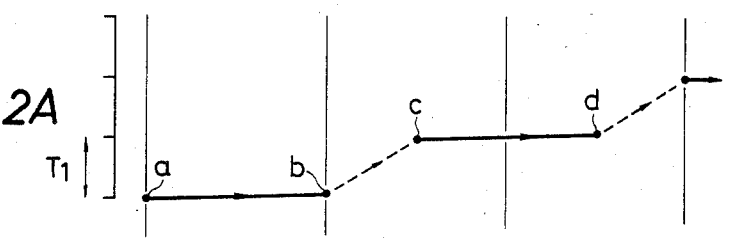
Figure 2B:
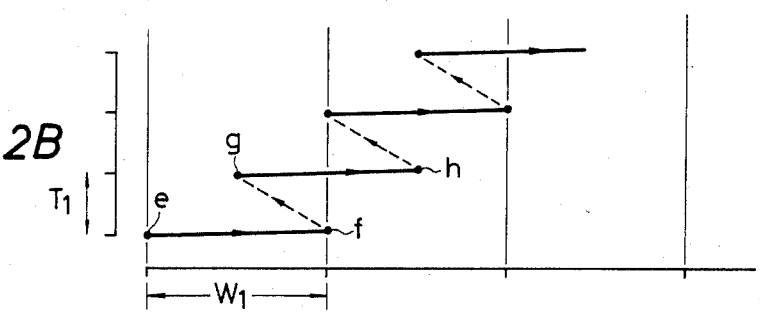

Now, an embodiment of disc player according to the present invention will be explained with reference to the FIG. 3 to FIG. 5D hereinafter.

FIG. 3 shows an essential portion of one example of the disc player according to the present invention. In FIG. 3, a disc 1 has thereon a spiral signal path each turn of which defines a record track in which an information signal containing program information and address information is recorded, like a digital audio disc, and is loaded on a disc holder 2 to be rotated by a disc rotating motor 3 to keep the scanning velocity constant at a predetermined value.

In the case of the operation in the normal reproducing mode, the information signal recorded in the record tracks on the disc 1 is read by a pick-up device 4 tracing the spiral signal path in the forward direction from the innermost turn to the outermost turn thereof successively. The information signal read from the record tracks on the disc in supplied to a decoder 5 from the pick-up device 4. Reproduced program information is obtained at one of the output terminals of the decoder 5 and derived from a terminal 6 to which a signal precessing circuit (not shown in FIG. 3) provided for dealing with the reproduced program information is connected. On the other hand, reproduced address information in obtained at the other of the output terminals of the decoder 5 and derived from a terminal 7 to which another signal processing circuit (not shown in FIG. 3) provided for dealing with the reproduced address information is connected.

Further, a command signal generating circuit 8 is provided and a command signal $S_f$ for commanding to move the reading position by the pick-up device 4 in the forward direction, a command signal $S_j$ for commanding to perform a track jump operation and a command signal $S_r$ for commanding to move the reading position by the pick-up device 4 in the reverse direction opposite to the forward direction are obtained from first, second and third output terminals thereof, respectively. The command signal $S_j$ commands selectively to perform a small scale track jump operation, for example, one track jump operation for rapidly moving the reading position by the pick-up device 4 in the direction transverse to the spiral signal path on the disc 1 to an adjoining record track from the record track at which the reading position by the pick-up device is presently situated, a middle scale tracking jump operation, for example, ten track jump operation for rapidly moving the reading position by the pick-up device 4 in the direction transverse to the spiral signal path on the disc 1 to a record track located ten tracks away from the record track at which the reading position by the pick-up device is presently situated or a large scale track jump operation, for example, hundred track jump operation for rapidly moving the reading position by the pick-up device 4 in the direction transverse the spiral signal path on the disc 1 to a record track located about one hundred tracks away from the record track at which the reading position by the pick-up device is presently situated.

Figure 4A:
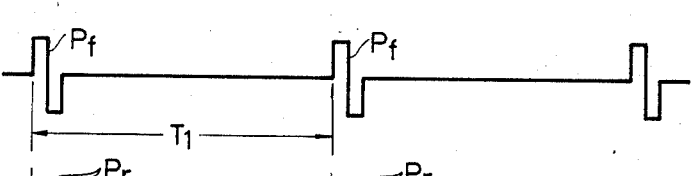
Figure 4B:
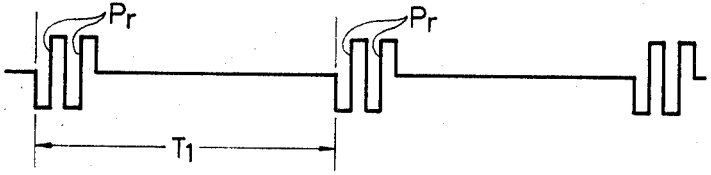

When the disc player is operative in the fast forwarding mode accompanied with the small scale track jump operation performed repeatedly, the command signal $S_f$ and the command signal $S_j$ which commands to perform the one track jump operation are supplied to a forward track jump pulse producing circuit 9 and thereby a train of forward one track jump pulses $P_f$, each of which appears at intervals of the period $T_1$ as shown in FIG. 4A is obtained at the output terminal of the forward track jump pulse producing circuit 9. On the other hand, when the disc player is operative in the fast reversing mode accompanied with the small scale track jump operation performed repeatedly, the command signal $S_r$ and the command signal $S_j$ which commands to perform the one track jump operation are supplied to a reverse track jump pulse producing circuit 10 and thereby a train of pairs of reverse one track jump pulses $P_r$, each pair of which appear at intervals of the period $T_1$ as shown in FIG. 4B is obtained at the output terminal of the reverse track jump pulse producing circuit 10. These trains of the forward one track jump pulses $P_f$ and the pairs of reverse one track jump pulses $P_r$ are supplied selectively to a tracking drive circuit 11 and a control signal obtained in response to each forward one track jump pulse $P_f$ or each reverse one track jump pulse $P_r$ is supplied to a tracking control device provided in the pick-up device 4 from the tracking drive circuit 11.

When the train of the forward one track jump pulses $P_f$ is supplied to the tracking drive circuit 11, the reading position by the pick-up device 4 is shifted quickly to the record track adjoining outside to the record track at which the reading position by the pick-up device 4 is presently located by the tracking control device whenever the control signal obtained in response to the forward one track jump pulse $P_f$ is supplied to the tracking control device, so that the one track jump operation is carried out once in the forward direction, and the reading position by the pick-up device 4 is under the tracking control by a tracking servocontrol mechanism (not shown in FIG. 3) in the normal reproducing mode during the remaining periods. Accordingly, in this case, the one track jump operation is performed repeatedly in the forward direction at intervals of the period $T_1$.

FIG. 4C shows the movement of the reading position by the pick-up device 4 which is moved by the above mentioned one track jump operation performed repeatedly in the forward direction. In FIG. 4C, the ordinate represents the time and the abscissa represents the distance measured along the spiral signal path on the disc 1. Further, for convenience' sake, the record tracks each being defined by one turn of the spiral signal path are approximated hereon to have the same track length $W_1$.

Referring to FIG. 4C, when the one track jump operation is carried out once, the reading position by the pick-up device 4 is moved by a distance measured along the spiral signal path corresponding to the track length $W_1$ as shown with a solid line, and then further moved by a distance measured along the spiral signal path corresponding to, for example, about a half of the track length $W_1$, that is, about $\frac{1}{2}W_1$ as shown with a broken line during the succeeding period for the normal reproducing mode. Accordingly, the reading position by the pick-up device 4 is totally moved by a distance measured along the spiral signal path corresponding to about one and a half of the track length $W_1$, that is, about $3/2W_1$ in the forward direction during the period $T_1$.

On the other hand, when the train of the pairs of reverse one track jump pulses $P_r$ is supplied to the tracking drive circuit 11, the reading position by the pick-up device 4 is shifted quickly to the record track adjoining inside to the record track at which the reading position by the pick-up device 4 is presently located by the tracking control device whenever the control signal obtained in response to the reverse one track jump pulse $P_r$ is supplied to the tracking control device, so that the one track jump operation is carried out once in the reverse direction, and the reading position by the pick-up device 4 is under the tracking control by the tracking servocontrol mechanism in the normal reproducing mode during the remaining periods. Accordingly, in this case, the one track jump operation is performed twice by twice repeatedly in the reverse direction at intervals of the period $T_1$.

FIG. 4D shows the movement of the reading position by the pick-up device 4 which is moved by the above mentioned one track jump operation performed repeatedly in the reverse direction, in the same manner as FIG. 4C. Referring to FIG. 4D, when the one track jump operation in carried out twice in succession, the reading position by the pick-up device 4 is moved in the reverse direction by a distance measured along the spiral signal path twice as long as the track length $W_1$, that is, corresponding to $2W_1$ as shown with a solid line, and then returned in the forward direction by a distance measured along the spiral signal path corresponding to about a half of the track length $W_1$, that is, about $\frac{1}{2}W_1$ as shown with a broken line during the succeeding period for the normal reproducing mode. Accordingly, in this case, the reading position by the pick-up device 4 is totally moved by a distance measured along the spiral signal path corresponding to about one and a half of the track length $W_1$, that is, about $3/2W_1$ in the reverse direction during the period $T_1$. This substantial moving distance measured along the spiral signal path during the period $T_1$ in the reverse direction is qual to that in the forward direction mentioned above.

Consequently, in the case of the above mentioned example, the substantial moving distance measured along the spiral signal path in respect of the reading position by the pick-up device 4 moved for a certain period in the fast reversing mode coincides approximately with the substantial moving distance measured along the spiral signal path in respect of the reading position by the pick-up device 4 moved for the same certain period in the fast forwarding mode.

Incidentally, in the example mentioned above, since the one track jump operation is performed twice in succession during the period $T_1$ in the fast reversing mode, the period for the normal reproducing mode taken in the fast reversing mode is shorter by the time necessary for performing the one track jump operation once than the period for the normal reproducing mode taken in the fast forwarding mode, and therefore the above mentioned substantial moving distance in the fast reversing mode is actually shorter slightly than that in the fast forwarding mode.

Next, another example of the disc player according to the present invention will be described hereinafter.

Figure 5A:
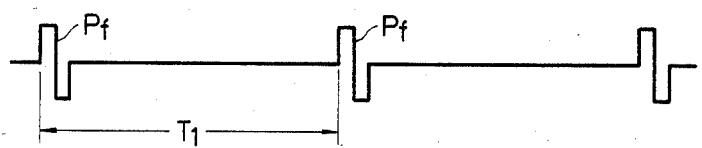
FIGS. 5A to 5D are illustrations used for explaining the fast forwarding mode and the fast reversing mode, in which a small scale track jump operation is repeatedly performed, taken by another example of the disc player according to the present invention.
Figure 5B:
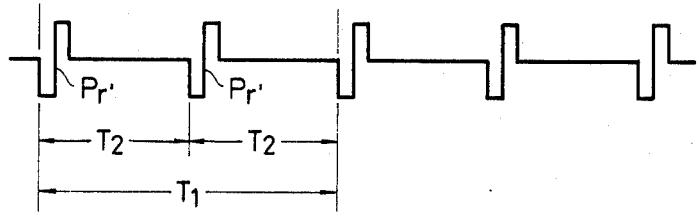
Figure 5C:
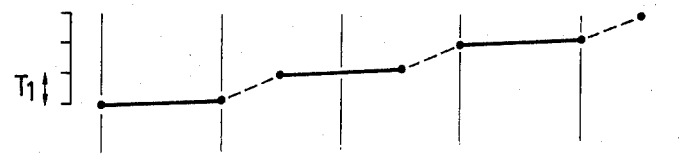
Figure 5D:
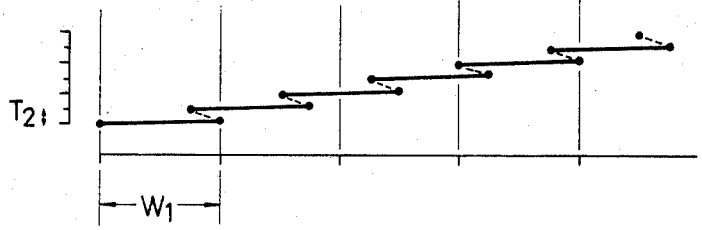

This second example has its configuration of circuit blocks in the same manner as the example of FIG. 3. In this example, from a forward track jump pulse producing circuit corresponding to the forward track jump pulse producing circuit 9 shown in FIG. 3, the train of the forward one track jump pulses $P_f$ which is the same as that shown in FIG. 4A is obtained as shown in FIG. 5A, and from a reverse one track jump pulse producing circuit corresponding to the reverse one track jump pulse producing circuit 10 shown in FIG. 3, a train of reverse one track jump pulses $P_r'$, each of which appears at intervals of a period $T_2$ corresponding to a half of the period $T_1$ as shown in FIG. 5B is obtained. Accordingly, the one track jump operation is performed repeatedly in the forward direction in the same manner as that in the example of FIG. 3 and the movement of the reading position by the pick-up device moved by such one track jump operation performed repeatedly in the forward direction is shown in FIG. 5C in the same manner as in FIG. 4C. However, in the case of this example, the one track jump operation is performed repeatedly in the reverse direction at intervals of the period $T_2$ and therefore the one track jump operation is performed in the reverse direction twice at regular intervals in the period $T_1$. FIG. 5D shows the movement of the reading position by the pick-up device moved by such one track jump operation as performed in the reverse direction twice at regular intervals in the period $T_1$, in the same manner as FIG. 4D.

Referring to FIG. 5D, the reading position by the pick-up device is first moved in the reverse direction by a distance measured along the spiral signal path corresponding to the track length $W_1$ as shown with a solid line, then returned in the forward direction by a distance measured along the spiral signal path corresponding to about a quarter of the track length $W_1$, that is, about $\frac{1}{4}W_1$ as shown with a broken line during the period $T_2$. Accordingly, in this case, the reading position by the pick-up device is totally moved by a distance measured along the spiral signal path corresponding to about three quarters of the track length $W_1$, that is, about $\frac{3}{4}W_1$ in the reverse direction during the period $T_2$. This means that the reading position by the pick-up device is moved in the reverse direction by a distance along the spiral signal path corresponding to about $3/2W_1$ during the period $T_1$ which is twice as long as the period $T_2$. This substantial moving distance measured along the spiral signal path during the period $T_1$ in the reverse direction is equal to that in the forward direction.

As described above, in the case of this example also, the substantial moving distance measured along the spiral signal path in respect of the reading position by the pick-up device moved for a certain period in the fast reversing mode coincides approximately with the substantial moving distance measured along the spiral signal path in respect of the reading position by the pick-up device moved for the same certain period in the fast forwarding mode.

What is claimed is:

1. A disc player for reproducing from a rotating disc an information signal recorded thereon in a plurality of record tracks defined by successive turns of a spiral signal path, said disc player being selectively operable in one of a normal reproducing mode, a fast-forwarding mode and a fast-reversing mode, said disc player comprising:
   pick-up means for determining a reading position on said disc;
   control means for controlling said pick-up means to move said reading position radially in respect to the center of rotation of said disc, said control means moving said reading position gradually in said normal reproducing mode in a forward radial direction of said disc so as to accurately trace said spiral signal path as said disc rotates to reproduce said information signal recorded therein; and
   track jump circuit means operative in said fast-forwarding mode and in said fast-reversing mode to initiate a track jump operation in said forward radial direction and in a reverse radial direction, respectively, at regular first intervals, and regular second intervals, respectively;
   said control means being responsive to each said initiation of a track jump operation in said fast-forwarding and said fast-reversing modes, respectively, to cause said pick-up means to jump said reading position from one turn to another turn during a first minor portion of the respective interval and to move said reading position gradually in said forward radial direction so as to trace substantially along said other turn for the remaining major portion of said respective interval;
   said first interval in said fast-forwarding mode being longer than said second interval in said fast-reversing mode, whereby the number of said jump operations occurring in a predetermined time in said fast-reversing mode is greater than the number of said jump operations occurring in said predetermined time in said fast-forwarding mode.

2. A disc player according to claim 1; wherein said control means includes driving means for driving a tracking control device provided in said pick-up means for maintaining the reading position determined by said pick-up means on said spiral signal path in a correct tracking relation thereto in the normal reproducing mode.

3. A disc player according to claim 1; wherein said track jump circuit means includes pulse supplying means for selectively supplying to said control means one of a first track jump pulse for causing said control means to perform the track jump operation once in said forward radial direction and a second track jump pulse for causing said control means to perform the track jump operation once in said reverse radial direction.

4. A disc player according to claim 3; wherein said track jump circuit means further includes command circuit means for controlling said pulse supplying means and operative in the fast-forwarding and fast-reversing modes of operation, respectively, to generate a jump control signal once during each said respective interval, and to selectively generate one of a forward signal and a reverse signal, respectively, said pulse supplying means being responsive to said jump control signal together with said forward signal to supply said first track jump pulse to said control means, and being responsive to said jump control signal together with said reverse signal to supply said second track jump pulse to said control means.

* * * * *